(12) United States Patent
Borg et al.

(10) Patent No.: US 10,019,861 B2
(45) Date of Patent: Jul. 10, 2018

(54) ACCESS CONTROL COMMUNICATION DEVICE, METHOD, COMPUTER PROGRAM AND COMPUTER PROGRAM PRODUCT

(71) Applicant: ASSA ABLOY AB, Stockholm (SE)

(72) Inventors: Anders Borg, Vallentuna (SE); Mats Cederblad, Haesselby (SE); Daniel Garmen, Bromma (SE); Tomas Jonsson, Roenninge (SE); Peter Siklosi, Taeby (SE)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 15/825,753

(22) Filed: Nov. 29, 2017

(65) Prior Publication Data

US 2018/0089920 A1    Mar. 29, 2018

Related U.S. Application Data

(63) Continuation of application No. 15/413,046, filed on Jan. 23, 2017, now Pat. No. 9,858,740, which is a
(Continued)

(30) Foreign Application Priority Data

Jul. 5, 2013   (EP) .................................. 13175282

(51) Int. Cl.
*G07C 9/00* (2006.01)
*H04W 4/00* (2018.01)
*H04W 4/80* (2018.01)

(52) U.S. Cl.
CPC ..... *G07C 9/00309* (2013.01); *G07C 9/00571* (2013.01); *G07C 9/00817* (2013.01);
(Continued)

(58) Field of Classification Search
CPC ........ G06F 21/32; G06F 21/36; G06F 21/629; G06F 2221/2111; G06F 3/0346; G06F 21/31; G06F 21/35; G06F 21/88
(Continued)

(56) References Cited

U.S. PATENT DOCUMENTS

| 4,727,368 A | 2/1988 | Larson et al. |
| 4,789,859 A | 12/1988 | Clarkson et al. |

(Continued)

FOREIGN PATENT DOCUMENTS

| CN | 1437808 | 8/2003 |
| CN | 1717665 | 1/2006 |

(Continued)

OTHER PUBLICATIONS

Official Action with English Translation for Chile Patent Application No. 201503670, dated Oct. 19, 2017, 10 pages.
(Continued)

*Primary Examiner* — Mark Blouin
(74) *Attorney, Agent, or Firm* — Sheridan Ross P.C.

(57) ABSTRACT

It is presented an access control communication device comprising: a short distance radio communication module; a cellular radio communication module; and a controller arranged to communicate access rights associated with a key device, using the cellular radio communication module, with an access control device over a cellular communication network, the communicating comprising sending a request for access management data associated with the lock device, and receiving access management data associated with the lock device; and the controller further being arranged to transmit the access management data to the key device for transfer to the lock device, the communicating and transmitting being arranged to be performed upon the access control device being in communication with the key device (Continued)

using the short distance radio communication module. A corresponding method, computer program and computer program product area also presented.

16 Claims, 3 Drawing Sheets

Related U.S. Application Data continuation of application No. 14/901,764, filed as application No. PCT/EP2014/064162 on Jul. 3, 2014, now Pat. No. 9,595,148.

(52) U.S. Cl.
CPC ............ *H04W 4/008* (2013.01); *H04W 4/80* (2018.02); *G07C 2009/00317* (2013.01); *G07C 2009/00634* (2013.01); *G07C 2009/00793* (2013.01)

(58) Field of Classification Search
USPC .......................................................... 340/5.1
See application file for complete search history.

(56) References Cited

U.S. PATENT DOCUMENTS

| | | | |
|---|---|---|---|
| 5,204,663 | A | 4/1993 | Lee |
| 5,475,375 | A | 12/1995 | Barrett et al. |
| 5,678,200 | A | 10/1997 | Levi |
| 5,903,845 | A | 5/1999 | Buhrmann et al. |
| 6,095,416 | A | 8/2000 | Grant et al. |
| 6,216,227 | B1 | 4/2001 | Goldstein |
| 6,257,486 | B1 | 7/2001 | Teicher et al. |
| 6,374,356 | B1 | 4/2002 | Daigneault et al. |
| 6,384,711 | B1 * | 5/2002 | Cregger ............ G07C 9/00103 340/5.65 |
| 6,577,299 | B1 | 6/2003 | Schiller et al. |
| 6,624,739 | B1 | 9/2003 | Stobbe |
| 6,668,322 | B1 | 12/2003 | Wood et al. |
| 6,719,200 | B1 | 4/2004 | Wiebe |
| 6,766,450 | B2 | 7/2004 | Micali |
| 6,859,650 | B1 | 2/2005 | Ritter |
| 6,895,234 | B1 | 5/2005 | Laursen et al. |
| 7,012,503 | B2 | 3/2006 | Nielsen |
| 7,114,179 | B1 | 9/2006 | Ritter et al. |
| 7,190,948 | B2 | 3/2007 | Donley et al. |
| 7,197,767 | B2 | 3/2007 | Kusakabe et al. |
| 7,205,882 | B2 | 4/2007 | Libin |
| 7,308,254 | B1 | 12/2007 | Rissanen |
| 7,363,252 | B2 | 4/2008 | Fujimoto |
| 7,376,839 | B2 | 5/2008 | Carta et al. |
| 7,380,279 | B2 | 5/2008 | Prokupets et al. |
| 7,600,129 | B2 | 10/2009 | Libin et al. |
| 7,616,091 | B2 | 11/2009 | Libin |
| 7,698,566 | B1 | 4/2010 | Stone |
| 7,706,778 | B2 | 4/2010 | Lowe |
| 7,716,486 | B2 | 5/2010 | Libin et al. |
| 7,730,126 | B2 | 6/2010 | Crawford |
| 7,775,429 | B2 | 8/2010 | Radicella et al. |
| 7,822,989 | B2 | 10/2010 | Libin et al. |
| 7,823,193 | B2 | 10/2010 | Ritter et al. |
| 7,873,989 | B2 | 1/2011 | Karkas et al. |
| 8,074,271 | B2 | 12/2011 | Davis et al. |
| 8,102,799 | B2 | 1/2012 | Alexander et al. |
| 8,150,374 | B2 | 4/2012 | Lowe |
| 8,572,705 | B2 | 10/2013 | Ritter et al. |
| 8,578,472 | B2 | 11/2013 | Davis et al. |
| 9,589,406 | B2 | 3/2017 | Borg et al. |
| 9,595,148 | B2 | 3/2017 | Borg et al. |
| 9,704,321 | B1 | 7/2017 | Borg et al. |
| 2001/0018660 | A1 | 8/2001 | Sehr |
| 2003/0151493 | A1 | 8/2003 | Straumann et al. |
| 2003/0189096 | A1 | 10/2003 | Markkanen et al. |
| 2003/0190887 | A1 | 10/2003 | Hook et al. |
| 2003/0216143 | A1 | 11/2003 | Rose et al. |
| 2004/0039916 | A1 | 2/2004 | Aldis et al. |
| 2004/0050930 | A1 | 3/2004 | Rowe |
| 2004/0059590 | A1 | 3/2004 | Mercredi et al. |
| 2004/0078594 | A1 | 4/2004 | Scott |
| 2004/0130437 | A1 | 7/2004 | Stevens |
| 2004/0167881 | A1 | 8/2004 | Masuka |
| 2004/0177270 | A1 | 9/2004 | Little et al. |
| 2005/0055562 | A1 | 3/2005 | Guthery |
| 2005/0149443 | A1 | 7/2005 | Torvinen |
| 2005/0178833 | A1 | 8/2005 | Kisliakov |
| 2005/0271250 | A1 | 12/2005 | Vallone et al. |
| 2006/0049255 | A1 | 3/2006 | von Mueller et al. |
| 2006/0052091 | A1 | 3/2006 | Onyon et al. |
| 2006/0164235 | A1 | 7/2006 | Gounder |
| 2006/0165060 | A1 | 7/2006 | Dua |
| 2006/0170533 | A1 | 8/2006 | Chioiu et al. |
| 2006/0182661 | A1 | 8/2006 | Aquila |
| 2007/0067400 | A1 | 3/2007 | Kawakami et al. |
| 2007/0189532 | A1 | 8/2007 | Onozu et al. |
| 2007/0296545 | A1 | 12/2007 | Clare |
| 2008/0107269 | A1 | 5/2008 | Gehrmann et al. |
| 2008/0211620 | A1 | 9/2008 | Willgert |
| 2009/0153291 | A1 | 6/2009 | Larson et al. |
| 2009/0183541 | A1 | 7/2009 | Sadighi et al. |
| 2009/0259838 | A1 | 10/2009 | Lin |
| 2010/0042954 | A1 | 2/2010 | Rosenblatt et al. |
| 2010/0106773 | A1 | 4/2010 | Tsutazawa et al. |
| 2010/0245033 | A1 | 9/2010 | Sasakuma |
| 2011/0093928 | A1 | 4/2011 | Nakagawa et al. |
| 2011/0140838 | A1 | 6/2011 | Ocaña |
| 2011/0187493 | A1 | 8/2011 | Elfstrom et al. |
| 2012/0011907 | A1 | 1/2012 | Sprenger et al. |
| 2012/0114122 | A1 | 5/2012 | Metivier |
| 2012/0157058 | A1 | 6/2012 | Lowe |
| 2012/0169461 | A1 | 7/2012 | Dubois |
| 2012/0278901 | A1 | 11/2012 | Bunter |
| 2013/0093563 | A1 | 4/2013 | Adolfsson et al. |
| 2014/0013418 | A1 | 1/2014 | Davis et al. |
| 2014/0025408 | A1 | 1/2014 | Ritter et al. |
| 2014/0123317 | A1 | 5/2014 | Sughihara |
| 2015/0109098 | A1 | 4/2015 | Singh |
| 2015/0213247 | A1 | 7/2015 | Davis et al. |
| 2015/0213248 | A1 | 7/2015 | Davis et al. |
| 2015/0215322 | A1 | 7/2015 | Davis et al. |
| 2015/0220711 | A1 | 8/2015 | Lowe |
| 2015/0220721 | A1 | 8/2015 | Davis et al. |
| 2015/0220722 | A1 | 8/2015 | Davis et al. |
| 2015/0222613 | A1 | 8/2015 | Lowe |
| 2015/0222622 | A1 | 8/2015 | Lowe |
| 2015/0222623 | A1 | 8/2015 | Lowe |
| 2015/0223067 | A1 | 8/2015 | Lowe |
| 2016/0005248 | A1 | 1/2016 | Aase |
| 2017/0132865 | A1 | 5/2017 | Borg et al. |
| 2017/0309099 | A1 | 10/2017 | Borg et al. |

FOREIGN PATENT DOCUMENTS

| | | |
|---|---|---|
| CN | 101667308 | 3/2010 |
| CN | 101868810 | 10/2010 |
| CN | 102426715 | 4/2012 |
| CN | 103035054 | 4/2013 |
| CN | 103093531 | 5/2013 |
| EP | 0829828 | 3/1998 |
| EP | 1103922 | 5/2001 |
| EP | 1321901 | 6/2003 |
| EP | 1333409 | 8/2003 |
| EP | 1562153 | 8/2005 |
| EP | 1628255 | 2/2006 |
| EP | 1841166 | 10/2007 |
| FR | 2839833 | 11/2003 |
| JP | 2002-109238 | 4/2002 |
| JP | 2002-129792 | 5/2002 |
| KR | 10-2004-032311 | 4/2004 |
| WO | WO 93/14571 | 7/1993 |
| WO | WO 02/096070 | 11/2002 |
| WO | WO 03/081934 | 10/2003 |
| WO | WO 04/025545 | 3/2004 |

(56) References Cited

FOREIGN PATENT DOCUMENTS

| WO | WO 2004/070664 | 8/2004 |
|---|---|---|
| WO | WO 05/024549 | 3/2005 |
| WO | WO 2005/038728 | 4/2005 |
| WO | WO 2005/091516 | 9/2005 |
| WO | WO 2005/096651 | 10/2005 |
| WO | WO 2007/126375 | 11/2007 |
| WO | WO 2007/139909 | 12/2007 |
| WO | WO 2008/024162 | 2/2008 |
| WO | WO 2008/024320 | 2/2008 |
| WO | WO 2008/035115 | 3/2008 |
| WO | WO 2008/042302 | 4/2008 |
| WO | WO 2011/034482 | 3/2011 |
| WO | WO 2012/097917 | 7/2012 |
| WO | WO 2015/001019 | 1/2015 |

OTHER PUBLICATIONS

Esato—"Nokia Launches NFC Shell for Mobile Payments" http://www.esato.com/news/article.php/id=436 (Feb. 25, 2005) (3 pages).

Indala—"Product Families" www.indala.com/products/index.html (Copyright 2004) (2 pages).

NFC Forum—"About Near Field Communication" http://www.nfc-forum.org/aboutnfc/ (Copyright 2005) (3 pages).

NOKIA—"Use Cases" http://www.nokia.com (Copyright 2005) (2 pages).

Phillips Semiconductoers—"Near Field Communication PN511-Transmision module." (Feb. 2004) (18 pages).

International Search Report and Written Opinion prepared by the European Patent Office dated Sep. 17, 2014, for International Application No. PCT/EP2014/064162.

International Preliminary Report on Patentability (Chapter II) prepared by the European Patent Office dated May 5, 2015 for International Application No. PCT/EP2014/064162.

Official Action with English Translation for Chile Patent Application No. 201600006, dated Jul. 14, 2017, 14 pages.

Official Action with English Translation for China Patent Application No. 201480037722.2, dated Jan. 24, 2017, 20 pages.

International Search Report and Written Opinion prepared by the European Patent Office dated Sep. 2, 2014, for International Application No. PCT/EP2014/064178.

International Preliminary Report on Patentability (ChapterII) prepared by the European Patent Office dated May 5, 2015 for International Application No. PCT/EP2014/064178.

Official Action for Australia Patent Application No. 2014286137, dated Aug. 2, 2017, 4 pages.

Official Action with English Translation for China Patent Application No. 201480038149.7, dated Jan. 17, 2017, 21 pages.

Official Action with English Translation for China Patent Application No. 201480038149.7, dated Sep. 8, 2017, 10 pages.

Notice of Allowance for U.S. Appl. No. 14/901,764, dated Oct. 31, 2016 8 pages.

Official Action for U.S. Appl. No. 15/413,046, dated Feb. 28, 2017 5 pages.

Official Action for U.S. Appl. No. 15/413,046, dated Jun. 23, 2017 5 pages.

Notice of Allowance for U.S. Appl. No. 15/413,046, dated Sep. 6, 2017 7 pages.

Notice of Allowance for U.S. Appl. No. 14/901,802, dated Oct. 27, 2016 8 pages.

Notice of Allowance for U.S. Appl. No. 15/414,041, dated Mar. 16, 2017 8 pages.

Notice of Allowance for U.S. Appl. No. 15/644,606, dated Oct. 13, 2017 8 pages.

Official Action with English Translation for China Patent Application No. 201480037722.2, dated Sep. 29, 2017, 10 pages.

Official Action with English Translation for Chile Patent Application No. 201600006, dated Jan. 15, 2018, 20 pages.

\* cited by examiner

ACCESS CONTROL COMMUNICATION DEVICE, METHOD, COMPUTER PROGRAM AND COMPUTER PROGRAM PRODUCT

CROSS-REFERENCE TO RELATED APPLICATIONS

This application is a continuation of U.S. patent application Ser. No. 15/413,046, filed Jan. 23, 2017, which is a continuation of U.S. patent application Ser. No. 14/901,764, filed Dec. 29, 2015, now U.S. Pat. No. 9,595,148, which is a national stage application under 35 U.S.C. 371 and claims the benefit of PCT Application No. PCT/EP2014/064162 having an international filing date of Jul. 3, 2014, which designated the United States, which PCT application claimed the benefit of European Patent Application No. 13175282.6 filed Jul. 5, 2013, the disclosures of each of which are incorporated herein by reference.

TECHNICAL FIELD

The invention relates to an access control communication device, associated method, computer program and computer program product for facilitating communication between a key device and an access control device.

BACKGROUND

Access control systems based on electronic access are provided today using a variety of different topologies. One such solution is when electronic lock devices are installed without a power supply. The lock devices may then be powered when a matching key device is inserted, using an electrical connection with the key device.

An issue exists in how lock devices are provided with up-to-date access rights. For example, if a person loses a key device, it should be easy and reliable for an operator of the access control system to bar the lost key device from gaining access to any lock devices of the access control system.

In the prior art, the key devices are updated using dedicated key update devices connected to laptop computers. While this can provide updated access rights to the key devices for provision to the lock devices, the key update devices are large and cumbersome, whereby the keys are not updated very often. This leads to compromised security since a significant amount of time can flow from an operator updating access rights and the updated access rights being propagated to all lock devices.

SUMMARY

It is an object to provide a more convenient way to provide communication between an access control device and a key device.

According to a first aspect, it is presented an access control communication device comprising: a short distance radio communication module; a cellular radio communication module; and a controller arranged to communicate access rights associated with a key device, using the cellular radio communication module, with an access control device over a cellular communication network, the communicating comprising sending a request for access management data associated with the lock device, and receiving access management data associated with the lock device; and the controller further being arranged to transmit the access management data to the key device for transfer to the lock device, the communicating and transmitting being arranged to be performed upon the access control device being in communication with a key device using the short distance radio communication module. Such an access control communication device greatly simplifies communication between key device and access control device compared to the prior art. Moreover, such an access control communication device can be made small and could e.g. be carried in a pocket of a user. The communication can occur from the key device to the access control device and/or vice versa.

The controller may be arranged to perform any one or more of the following communication with the access control device upon the access control device being in contact with a key device using the short distance radio communication module: receiving updated access rights for one or more lock devices, receiving updated access rights specifically for the key device, receiving an updated validity time for the key device, receiving an updated time for a clock of the key device, sending an audit trail for one or more lock devices, and sending an audit trail for the key device. This provides better security by supplying access data between the key device and the access control device.

The controller may be arranged to only perform the communication with the access control device when a trigger condition has been determined to be true.

The trigger condition may be true when a timer of the access control communication device expires.

The access control communication device may further comprise a user input device, in which case the trigger condition is true when an update command is detected using the user input device.

The access control communication device may form part of a mobile communication terminal.

The access control communication device may further comprise a code input device, in which case the controller is arranged to extend a validity time of a key device in communication with the access control communication device, when a correct code has been entered using the code input device.

According to a second aspect, it is presented a method, performed in an access control communication device. The access control communication device comprises a short distance radio communication module; a cellular radio communication module; and a controller. The method comprises the steps of: determining that a key device is in communication with the access control device using the short distance radio communication module; and that the key device is in communication with a lock device for determining access to a physical space; obtaining an identifier of the lock device from the key device; communicating access rights associated with the key device, using the cellular radio communication module, with an access control device over a cellular communication network, the communicating comprising the sub-steps of: sending a request for access management data associated with the lock device, and receiving access management data associated with the lock device; and transmitting the access management data to the key device for transfer to the lock device.

The step of communicating may comprise performing any one or more of the following communication tasks with the access control device: receiving updated access rights for one or more lock devices, receiving updated access rights specifically for the key device, receiving an updated validity time for the key device, receiving an updated time for a clock of the key device, sending an audit trail for one or more lock devices and sending an audit trail for the key device.

The method may further comprise the steps of: determining whether a trigger condition is true; in which the case the step of communicating with the access control device only occurs when the trigger condition has been determined to be true.

In the step of determining whether a trigger condition is true, the trigger condition may be true when a timer of the access control communication device expires.

The access control communication device may further comprise a user input device, in which case in the step of determining whether a trigger condition is true, the trigger condition is true when an update command is detected from the user using the user input device.

The method may further comprise the steps of: receiving, using a code input device, a code entered by a user; and extending a validity time of a key device in communication with the access control communication device.

The step of communicating with the access control device may comprise acting as a gateway between the key device and the access control device.

According to a third aspect, it is provided a computer program comprising computer program code which, when run on an access control communication device, causes the access control communication device to: determine that a key device is in communication with the access control device using the short distance radio communication module and that the key device is in communication with a lock device for determining access to a physical space; obtain an identifier of the lock device from the key device; and communicate access rights associated with the key device, using the cellular radio communication module, with an access control device over a cellular communication network, the communicating comprising the sub-steps of: sending a request for access management data associated with the lock device, and receiving access management data associated with the lock device; and transmit the access management data to the key device for transfer to the lock device.

According to a fourth aspect, it is provided a computer program product comprising a computer program according to the third aspect and a computer readable means on which the computer program is stored.

It is to be noted that any feature of the first, second, third and fourth aspects may be applied, where appropriate, to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
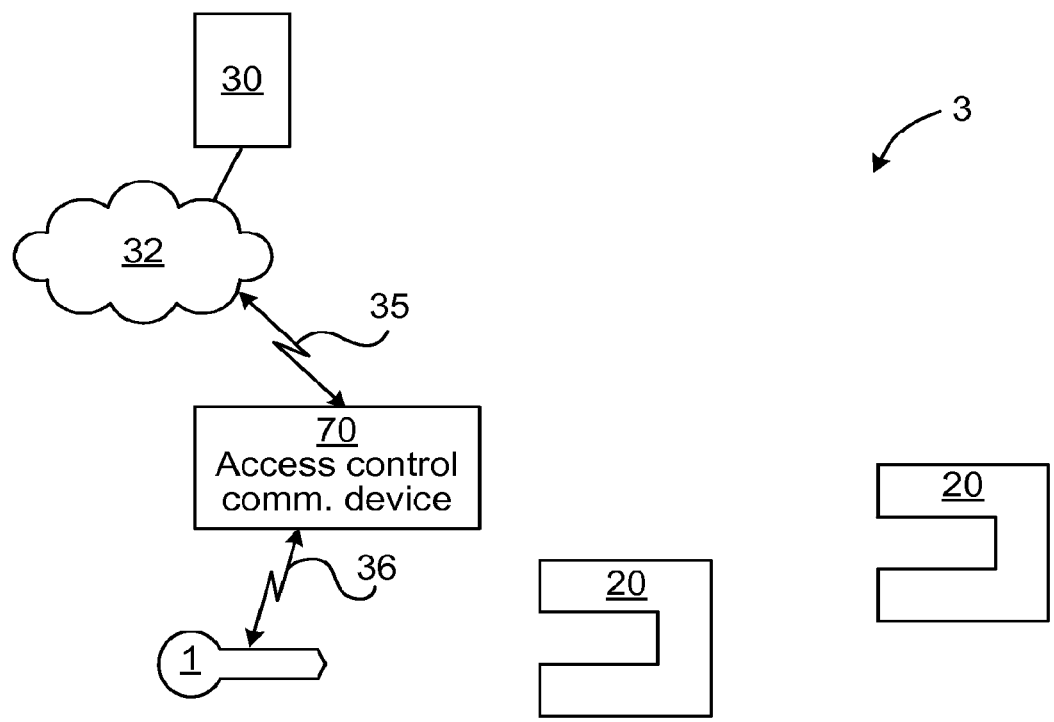
FIG. 1 is a schematic diagram illustrating an access control system in which embodiments presented herein can be applied.

FIG. 1 is a schematic diagram illustrating an access control system 3 in which embodiments presented herein can be applied. There are a number of lock devices 20. The lock devices 20 perform access control of key devices 1 presented to it, e.g. by inserting a key device in question 1 in the lock device 20, whereby the lock device 20 is powered by the key device 1. Also, there is communication between the key device 1 and the lock device 20 whereby the lock device performs electronic access control of the key device 1. When access is granted, the lock device 20 is set to an openable state, whereby a user can access a physical space, e.g. by opening a door which is access controlled by the lock device 20.

The key device 1 is equipped with a radio communication module, whereby it can communicate with an access control device 30 of the access control system 3. The radio communication module is adapted for a short range radio network (such as Bluetooth, WiFi, etc.), whereby the key device 1 communicates over a short range radio link 36 to an access control communication device 70. The access control communication device 70 communicates in turn via a cellular network link 35 with the cellular network 32. The cellular network 32 can be e.g. any one or a combination of LTE 30 (Long Term Evolution), UMTS (Universal Mobile Telecommunications System) utilising W-CDMA (Wideband Code Division Multiplex), CDMA2000 (Code Division Multiple Access 2000), or any other current or future wireless network, as long as the principles described hereinafter are applicable. In this way, the access control communication device 70 acts as a gateway, providing access to the access control device 30 for the key device 1 and vice versa.

The access control device 30 acts as a controller in the access control system 3 and may e.g. be implemented using one or more computers, e.g. a server and an operator terminal. An operator can thereby control access control rights and monitor other security aspects of the access control system using the access control device 30.

The connection between the key device 1 and the access control device 30 can be used for several purposes. For example the key devices 1 can be used for providing data from the access control device 30 to the lock devices 20. To make this happen, the key devices 1 connect to the access control device 30 on occasion to download such data. When each one of these key devices 1 is later inserted in a lock device 20, the data bound for the lock device 20 is transferred to the lock device 20.

One example will now be presented related to access rights. The key device 1, on occasion, downloads access rights that are later provided to the lock devices 20 when the key device 1 is inserted. The access rights are stored in a memory of the key device 1, thus providing an asynchronous communication to (or from) the lock devices 20. These access rights can include a revocation list, indicating key devices that are to be barred from gaining access. The revocation list is global in the access control system and thus applies to all key devices 1 and all lock devices 20. In this way, any changes to the revocation list are propagated efficiently and indiscriminately throughout the access control system 3 to lock devices even though these do not have a power supply by themselves and can not communicate directly with the access control device 30. Nevertheless, certain items in the access rights may be 30 associated with a particular lock device or a group of lock devices.

If a user in the access control system 3 loses a key device, the operator of the access control device 30 can update the access rights in the access control device such that the revocation list includes the identity of the lost key device. When one or more key devices 1 download the new revocation list, the revocation list is provided to any lock devices 20 in which the key device 1 is inserted. Even the lost key device will in many cases download the new revocation list, whereby on an attempt of a thief to gain access using the lost key device will be denied.

Alternatively or additionally, the access rights can include an access list, comprising a list of identifiers of key devices which are to gain access. The access rights can be global within the system, for all lock devices, for individual lock devices or for a group of lock devices.

Alternatively or additionally, each key device 1 can, on occasion, receive an updated validity time for the key device 1 in question. Each key device 1 may have access rights which are only valid until a specific time, after which the key device 1 loses its access rights. When the key device 1 is in contact with the access control device, its validity time can be extended. In this way, the key device 1 loses its access rights after a certain amount of time unless it makes contact with the access control device 30. In one embodiment, updated access rights are downloaded on the same occasion when the validity time of the key device is extended.

The significance of this combination of access rights and validity times will be illustrated in an example now. Let us say that a key device 1 gets stolen. The original owner reports this and the access control device 30 is updated with new access rights, barring the stolen key device from access to lock devices in the access control system 3. The thief does not want these new access rights to be provided to the lock devices and may prevent communication between the key device and the access control device 30 from happening. However, the validity time will eventually expire and the stolen key device 1 is 30 prevented from gaining access in that way. If the thief then somehow knows that the validity time has expired and allows the key device 1 to communicate with the access control device 30, the validity time may be extended, but the key device 1 will also download the updated access rights, whereby the stolen key device 1 is barred from access in that way. Optionally, the access control device 30 will not even grant an extended validity time since the stolen key device could be flagged as barred (or stolen).

Alternatively or additionally, each key device 1 can, on occasion, receive an updated time for the clock of the key device. This ensures that the clock of the key device is accurate, which ensures the validity times are applied accurately.

The communication between the key devices 1 and the access control device 30 can also be used in the other direction, towards the access control device. The mechanism is the same, where communication occurs via the access control communication device 70. But here, data is transmitted from the lock device 20 to the key device 1. When the key device 1 makes contact with the access control device 30, the data is uploaded to the access control device 30.

In this way, the key device 1 uses its memory as temporary storage for data from the lock devices 20 to the access control device 30. Analogously, the access control communication device 70 can also use its memory as temporary storage for data from the lock devices 20 to the access control device 30. For example, an audit trail from the lock devices 20 can be uploaded to the access control device 30 in this way. The audit trail to the access control device includes data about successful and/or failed attempts of gaining access to the lock device in question.

Also, an audit trail from the key device 1 can be uploaded to the access control device 30, indicating successful and/or failed attempts of the key device in question gaining access to the lock devices.

Optionally, the key device 1 communicates with the access control device 30 to obtain authorisation for the key device 1 to be granted access by a lock device 20 in real time, when the key device 1 is inserted in the lock device 20.

In this way, the access control device 30 is in full control of what key device 1 is allowed to gain access using what lock device 20.

As is explained in more detail below, various trigger conditions can be used to initiate the communication between the key devices 1 and the access control device 30.

Figure 2:
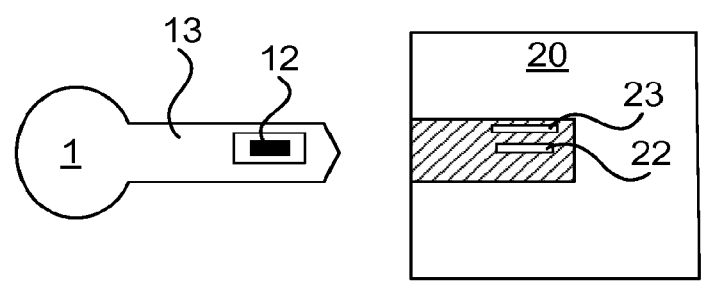
FIG. 2 is a schematic diagram more closely illustrating a key device and a lock device from FIG. 1.

FIG. 2 is a schematic diagram more closely illustrating a key device and a lock device from FIG. 1.

The key device 1 comprises a connector 12 and a mechanical interface 13 (such as a blade), which are electrically insulated from each other. The lock device 20 comprises a socket with a first connector 22 and a second connector 23. The first connector 22 is positioned such that, when the key device 1 is inserted in the socket, the first connector 22 makes contact with the connector 12 of the key device. The connection can be galvanic, or alternatively an inductive connection. In the case of an inductive connection, the connectors do not need to physically connect. Analogously, the second connector 23 is positioned such that, when the key device 1 is inserted in the socket, the second connector 23 makes galvanic contact with the mechanical interface 13 of the key device 1. This arrangement provides a dual terminal connection between the key device 1 and the lock device 20 when the key device 1 is inserted in the socket of the lock device 20. The dual terminal connection is used both for communication between the key device 1 and the lock device and for powering the lock device by transferring electric power from a power supply of the key device 1 to the lock device 20. Alternatively, separate connectors (not shown) can be provided for powering the lock device 20 and communication between the key device 1 and the lock device 20.

Figure 3:
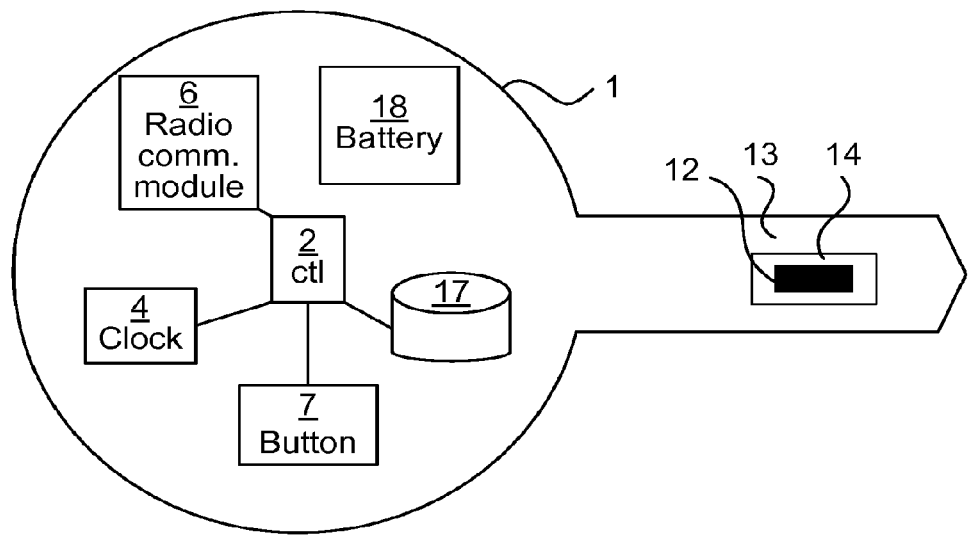
FIG. 3 is a schematic diagram illustrating some components of the key device of FIGS. 1 and 2.

FIG. 3 is a schematic diagram illustrating some components of the key device of FIGS. 1 and 2. A processor 2 is provided using any combination of one or more of a suitable central processing unit (CPU), multiprocessor, microcontroller, digital signal processor (DSP), application specific integrated circuit etc., capable of executing software instructions stored in a memory 17, which can thus be a computer program product.

The memory 17 can be any combination of read and write memory (RAM) and read only memory (ROM). The memory 17 also comprises persistent storage, which, for example, can be any single one or combination of solid state memory, magnetic memory, or optical memory.

Optionally, the processor 2 and the memory 17 can be provided in a single microcontroller unit (MCU).

The key device 1 also comprises a radio communication module 6. The radio communication module 6 comprises one or more transceivers, comprising analogue and digital components, and a suitable number of antennas. The radio communication module can be provided for communication over short range radio (such as Bluetooth, WiFi, etc.) with the access control communication device 70. Optionally, the radio communication module 6 can also be adapted to connect independently to a cellular network for communication with the access control device. Using the radio communication module 6, the key device 1 can communicate with an access control device as explained above.

A clock 4 is provided as part of the key device 1 and is used to enforce the validity times described above.

A battery 18 is provided to power all electrical components of the key device and also to power lock devices as explained above. The battery 18 can be a rechargeable battery or an exchangeable disposable battery.

The key device 1 is optionally provided with user input element, such as a push button 7 or similar, which can e.g. be used by a user to start communication with the access control device.

Other components of the key device 1 are omitted in order not to obscure the concepts presented herein.

The key device 1 comprises a mechanical interface 13 for mechanically manoeuvring a lock device 20 upon successful access control. The connector 12 is provided with electrical insulation 14 from the mechanical interface, to allow two independent galvanic contact terminals with a lock device.

Figure 4:
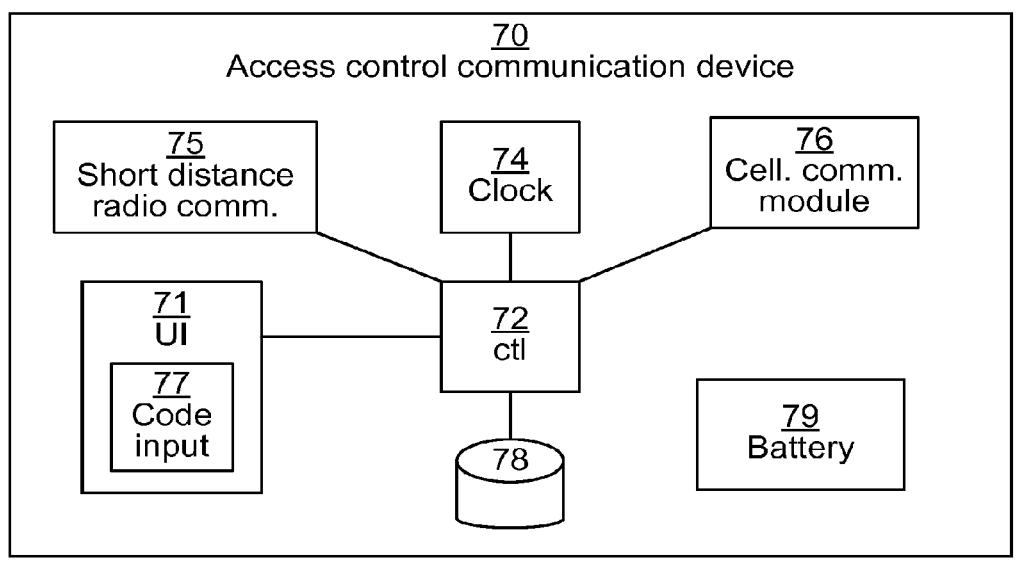
FIG. 4 is a schematic diagram illustrating the access control communication device of FIG. 1.

FIG. 4 is a schematic diagram illustrating some components of the access control communication device 70 of FIG. 1. A processor, also known as a controller, 72 is provided using any combination of one or more of a suitable central processing unit (CPU), multiprocessor, microcontroller, digital signal processor (DSP), application specific integrated circuit etc., capable of executing software instructions stored in a memory 78, which can thus be a computer program product. The processor 72 can be arranged to execute software instructions stored in the memory 78 to perform any one of the methods described with reference to FIG. 5 below.

The memory 78 can be any combination of read and write memory (RAM) and read only memory (ROM). The memory 78 also comprises persistent storage, which, for example, can be any single one or combination of solid state memory, magnetic memory, or optical memory. Optionally, part or all of the memory 78 is included in a Subscriber Identity Module (SIM), thereby implementing secure storage and application execution environment, and can provide credentials which can be used by a cellular communication module 76.

The cellular communication module 76 comprises one or more transceivers, comprising analogue and digital components, and a suitable number of antennas. The cellular communication module 76 is provided for communication with a cellular network such as the cellular network 32 of FIG. 1, to connect with the access control device 30.

A short distance radio communication module 75 is provided for communication over short range radio (such as Bluetooth, WiFi, etc.), e.g. with the key device 1 as explained above.

A clock 74 is provided and a battery 79 is provided to power all electrical components of the access control communication device 70. The battery 79 can be a rechargeable battery or an exchangeable disposable battery.

A user interface 71 is provided to allow a user to input data and to receive output of data. For example, the user interface 71 can comprise one or more of a display, which is optionally touch sensitive, a keypad, a microphone, a speaker, etc.

Optionally, a code input device 77 is provided as part of the user interface 71. The code input device 77 can e.g. be used to allow the user to extend the validity time of a key device 1 in contact with the access control communication device 70, when access to the access control device is not available over the cellular network e.g. due to current radio conditions/radio isolation. The code input device can e.g. be a keypad or part of a suitably controlled touch sensitive display.

Other components of the access control communication device 70 are omitted in order not to obscure the concepts presented herein.

In one embodiment, the access control communication device 70 forms part of a mobile communication terminal.

Figure 5:
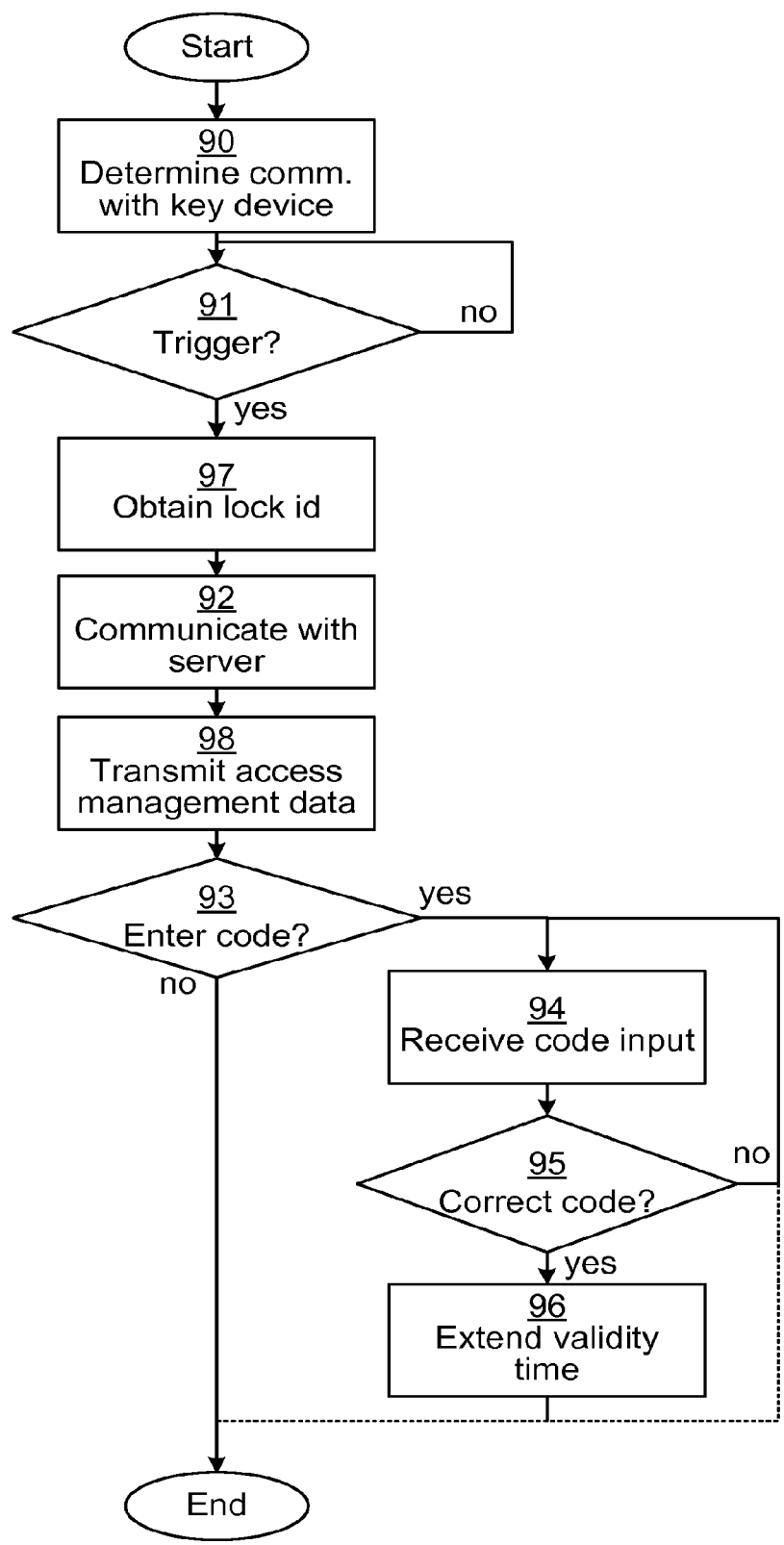
FIG. 5 is a schematic diagram illustrating a method performed in the access control communication device of FIGS. 1 and 4.

FIG. 5 is a schematic diagram illustrating a method performed in the access control communication device 70 of FIGS. 1 and 4. The method can e.g. be implemented in the access control communication device 70 using software instructions stored in the memory 78 which, when executed by the processor (controller) 72 causes the processor to perform any embodiment of the method described below.

In a determine communication with key device step 90, the access control communication device determines that a key device is in communication with the access control device using its short distance radio communication module (see 75 of FIG. 4).

In an optional trigger step 91, it is determined whether a trigger condition is true. If this is the case, the method continues to an obtain lock id step 97. Otherwise, the method repeats the conditional trigger step 91, optionally after an idle period.

The trigger condition can e.g. be that a timer of the access control communication device expires. Alternatively or additionally, the trigger condition can be that a user input element (71 of FIG. 4) of the access control communication device is actuated, indicating an update command. Alternatively or additionally, the trigger condition can be that communication with the key device is possible.

In an obtain lock id step 97, an identifier of the lock device is obtained from the key device.

In the communicate with access control device step 92, the access control communication device communicates with the access control device when possible, acting as a gateway for communication described with reference to FIG. 1 above, e.g. to update access rights and/or to provide audit logs. The access control communication device can thus act as a gateway between the key device and the access control device. If the access control communication device is unable to communicate with the access control device, the access control communication device is considered to be off-line.

This step comprises the sub-steps of sending a request for access management data associated with the lock device and receiving access management data associated with the lock device.

Access management data is here to be interpreted as data for managing access data. In particular, access management data is not the same as operational access data communicated between the key device and the lock device when access is to be granted or denied. Hence, the access control communication device and the key device can be used for providing management data from the access control device to the lock devices.

Using online communication to request and receive access management data associated with the lock device, there is only a small amount of data that the access control communication device only needs to receive from the access control device. Particularly when the access control system comprises a large amount of locks, this is a great advantage. Online communication is to be interpreted as the ability to communicate as needed on demand. Offline communication, on the other hand is to be interpreted as communication where communication is stored by an intermediate device for further forwarding when the next link to the addressee becomes available.

In a transmit access management data step 98, the access management data is transmitted to the key device for transfer to the lock device.

In the conditional enter code step 93, it is determined whether a code needs to be entered. This can e.g. be due to the access control communication device (and thus any connected key device) being off-line and a code needs to be entered to extend the validity time of the key device in contact with the access control communication device. In one embodiment, it is required to enter a code every so often to extend the validity time of a key device. This could be every time the validity time is extended or less often (or more often) than that. This prevents someone not knowing the code from gaining access using a lost key device, even if the revocation list has not been updated yet. In one embodiment, it is required to enter a code every time access to a lock device is needed, regardless if the key device is offline or online. If a code needs to be entered, the method continues to a receive code input step 94. Otherwise, the method ends.

In the receive code input step 94, a code is received from the user of the access control communication device using the code input device of the access control communication device.

In a conditional correct code step 95, it is evaluated whether the code which was input by the user is correct or not. If this is the case, the method continues to an extend validity time step 96. Otherwise, the method either returns to the receive code input step 94 or the method ends, if too many unsuccessful attempts of code input have been detected.

In the extend validity time step 96, the validity time of the key device in contact with the access control communication device is extended, as explained above.

Optionally, the method is repeated to be ready for more communication between the access control device and the key device.

Here now follows a list of embodiments from another perspective, enumerated with roman numerals.

i. An access control communication device comprising:
a short distance radio communication module;
a cellular radio communication module; and
a controller arranged to communicate access rights associated with a key device, using the cellular radio communication module, with an access control device over a cellular communication network upon the access control device being in communication with the key device using the short distance radio communication module.

ii. The access control communication device according to claim i, wherein the controller is arranged to perform any one or more of the following communication with the access control device upon the access control device being in contact with a key device using the short distance radio communication module: receiving updated access rights for one or more lock devices, receiving updated access rights specifically for the key device, receiving an updated validity time for the key device, receiving an updated time for a clock of the key device, sending an audit trail for one or more lock devices, and sending an audit trail for the key device.

iii. The access control communication device according to claim i or ii, wherein the controller is arranged to only perform the communication with the access control device when a trigger condition has been determined to be true.

iv. The access control communication device according to claim iii, wherein the trigger condition is true when a timer of the access control communication device expires.

v. The access control communication device according to claims iii or iv, wherein the access control communication device further comprises a user interface, and the trigger condition is true when an update command is detected using the user interface.

vi. The access control communication device according to any one of claims i to v, wherein the access control communication device forms part of a mobile communication terminal.

vii. The access control communication device according to any one of claims i to vi further comprising a code input device, wherein the controller is arranged to extend a validity time of a key device in communication with the access control communication device, when a correct code has been entered using the code input device.

viii. A method, performed in an access control communication device, the access control communication device comprising a short distance radio communication module; a cellular radio communication module; and a controller, the method comprising the steps of:
determining that a key device is in communication with the access control device using the short distance radio communication module; and
communicating, access rights associated with the key device using the cellular radio communication module, with an access control device over a cellular communication network.

ix. The method according to claim viii, wherein the step of communicating comprises performing any one or more of the following communication tasks with the access control device: receiving updated access rights for one or more lock devices, receiving updated access rights specifically for the key device, receiving an updated validity time for the key device, receiving an updated time for a clock of the key device, sending an audit trail for one or more lock devices and sending an audit trail for the key device.

x. The method according to claim viii or ix, further comprising the step of:
determining whether a trigger condition is true;

and wherein the step of communicating with the access control device only occurs when the trigger condition has been determined to be true.

xi. The method according to claim x, wherein in the step of determining whether a trigger condition is true, the trigger condition is true when a timer of the access control communication device expires.

xii. The method according to claims x or xi, wherein the access control communication device further comprises a user interface, and in the step of determining whether a trigger condition is true, the trigger condition is true when an update command is detected from the user using the user interface.

xiii. The method according to any one of claims ix to xii, further comprising the steps of:
receiving, using a code input device, a code entered by a user; and
extending a validity time of a key device in communication with the access control communication device.

xiv. The method according to any one of claims ix to xiii, wherein the step of communicating with the access control device comprises acting as a gateway between the key device and the access control device.

xv. A computer program comprising computer program code which, when run on an access control communication device, causes the access control communication device to:
determine that a key device is in communication with the access control device using the short distance radio communication module; and
communicate access rights associated with the key device, using the cellular radio communication module, with an access control device over a cellular communication network.

xvi. A computer program product comprising a computer program according to claim xv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. An access control communication device comprising:
a short distance radio communication module;
a cellular radio communication module; and
a controller arranged to communicate access rights associated with a key device, using the cellular radio communication module, with an access control device over a cellular communication network, the controller being arranged to communicate the access rights by receiving access management data associated with the lock device; and the controller further being arranged to transmit the access management data to the key device for transfer to the lock device, wherein the access management data is transmitted to the key device prior to the lock device performing access control of the key device.

2. The access control communication device according to claim 1, wherein the controller is arranged to perform any one or more of the following communication with the access control device upon the access control device being in contact with a key device using the short distance radio communication module:
receiving updated access rights for one or more lock devices, receiving updated access rights specifically for the key device, receiving an updated validity time for the key device, receiving an updated time for a clock of the key device, sending an audit trail for one or more lock devices, and sending an audit trail for the key device.

3. The access control communication device according to claim 1, wherein the controller is arranged to only perform the communication with the access control device when a trigger condition has been determined to be true.

4. The access control communication device according to claim 3, wherein the trigger condition is true when a timer of the access control communication device expires.

5. The access control communication device according to claim 3, wherein the access control communication device further comprises a user interface, and the trigger condition is true when an update command is detected using the user interface.

6. The access control communication device according to claim 1, wherein the access control communication device forms part of a mobile communication terminal.

7. The access control communication device according to claim 1 further comprising a code input device, wherein the controller is arranged to extend a validity time of a key device in communication with the access control communication device, when a correct code has been entered using the code input device.

8. A method, performed in an access control communication device, the access control communication device comprising a short distance radio communication module; a cellular radio communication module; and a controller, the method comprising the steps of:
determining that a key device is in communication with the access control device using the short distance radio communication module and that the key device is in communication with a lock device for determining access to a physical space;
obtaining an identifier of the lock device from the key device;
communicating access rights associated with the key device using the cellular radio communication module, with an access control device over a cellular communication network, the communicating comprising the sub-step of: receiving access management data associated with the lock device; and
transmitting the access management data to the key device for transfer to the lock device prior to the lock device performing access control of the key device.

9. The method according to claim 8, wherein the step of communicating comprises performing any one or more of the following communication tasks with the access control device: receiving updated access rights for one or more lock devices, receiving updated access rights specifically for the key device, receiving an updated validity time for the key device, receiving an updated time for a clock of the key device, sending an audit trail for one or more lock devices and sending an audit trail for the key device.

10. The method according to claim 8, further comprising the step of:
determining whether a trigger condition is true;
and wherein the step of communicating with the access control device only occurs when the trigger condition has been determined to be true.

11. The method according to claim 10, wherein in the step of determining whether a trigger condition is true, the trigger condition is true when a timer of the access control communication device expires.

12. The method according to claim 10, wherein the access control communication device further comprises a user interface, and in the step of determining whether a trigger condition is true, the trigger condition is true when an update command is detected from the user using the user interface.

13. The method according to claim 9, further comprising the steps of:
receiving, using a code input device, a code entered by a user; and
extending a validity time of a key device in communication with the access control communication device.

14. The method according to claim 9, wherein the step of communicating with the access control device comprises acting as a gateway between the key device and the access control device.

15. A computer program comprising computer program code which, when run on an access control communication device, causes the access control communication device to:
determine that a key device is in communication with the access control device using the short distance radio communication module and that the key device is in communication with a lock device for determining access to a physical space;
obtain an identifier of the lock device from the key device;
communicate access rights associated with the key device, using the cellular radio communication module, with an access control device over a cellular communication network, the communicating comprising the sub-step of: receiving access management data associated with the lock device; and
transmit the access management data to the key device for transfer to the lock device prior to the lock device performing access control of the key device.

16. A computer program product comprising a computer program according to claim 15 and a computer readable means on which the computer program is stored.

* * * * *